United States Patent
Grimm

(10) Patent No.: US 6,623,069 B2
(45) Date of Patent: Sep. 23, 2003

(54) VEHICLE ROOF, IN PARTICULAR A MOTOR VEHICLE ROOF

(75) Inventor: Rainer Grimm, Frankfurt (DE)

(73) Assignee: ArvinMeritor GmbH, Dietzenbach (DE)

(*) Notice: Subject to any disclaimer, the term of this patent is extended or adjusted under 35 U.S.C. 154(b) by 0 days.

(21) Appl. No.: 09/921,207

(22) Filed: Aug. 3, 2001

(65) Prior Publication Data

US 2002/0021028 A1 Feb. 21, 2002

(30) Foreign Application Priority Data

Aug. 4, 2000 (DE) ......................................... 100 38 205

(51) Int. Cl.⁷ .............................................. B60R 13/02
(52) U.S. Cl. ...................................... 296/214; 296/39.1
(58) Field of Search ................................ 396/214, 39.1, 396/208, 210

(56) References Cited

U.S. PATENT DOCUMENTS

| | | | | |
|---|---|---|---|---|
| 4,958,263 A | * | 9/1990 | Davenport et al. | 362/511 |
| 5,091,831 A | * | 2/1992 | Van Order et al. | 362/74 |
| 5,197,792 A | * | 3/1993 | Jiao et al. | 362/31 |
| 5,217,290 A | * | 6/1993 | Windross | 362/554 |
| 5,357,408 A | * | 10/1994 | Lecznar et al. | 362/74 |
| 5,548,492 A | * | 8/1996 | Hansen et al. | 362/83.1 |
| 5,549,492 A | * | 8/1996 | Hansen et al. | 362/492 |
| 5,599,086 A | * | 2/1997 | Dutta | 362/74 |
| 5,647,658 A | * | 7/1997 | Ziadi | 362/471 |
| 6,086,145 A | * | 7/2000 | Wandyez | 296/214 |
| 6,126,228 A | * | 10/2000 | Davis, Jr. et al. | 296/146.7 |
| 6,128,431 A | * | 10/2000 | Siminovitch | 385/147 |
| 6,273,499 B1 | * | 8/2001 | Guyon | 296/214 |
| 6,367,872 B1 | * | 4/2002 | Bohm et al. | 296/214 |

* cited by examiner

*Primary Examiner*—D. Glenn Dayoan
*Assistant Examiner*—Greg Blankenship
(74) *Attorney, Agent, or Firm*—Carlson, Gaskey & Olds

(57) ABSTRACT

A vehicle roof module with integrated lighting system for the interior lighting has several light-conducting rods, preferably made from glass, and a light source is foam-molded into an inner shell of the roof interior, molded from foamed plastic and forming the roof module, so that only the light outlet surfaces of the light-emitting ends of the light-conducting rods are disposed in the visible surface of the roof interior. By a suitable choice of the number of light-conducting rods and the distribution pattern of the corresponding light outlet surfaces, both a uniform interior lighting and special lighting effects can be achieved.

9 Claims, 2 Drawing Sheets

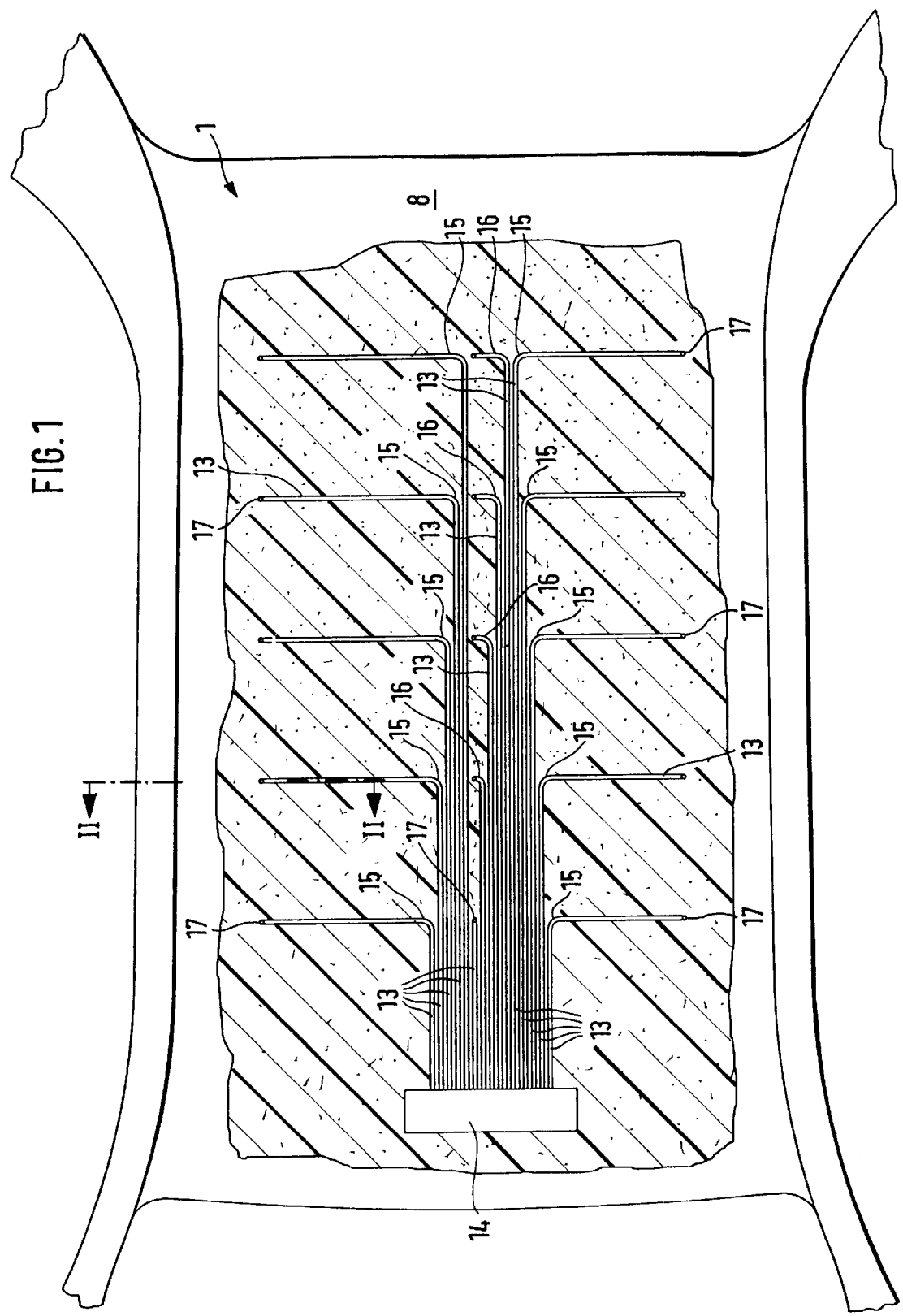

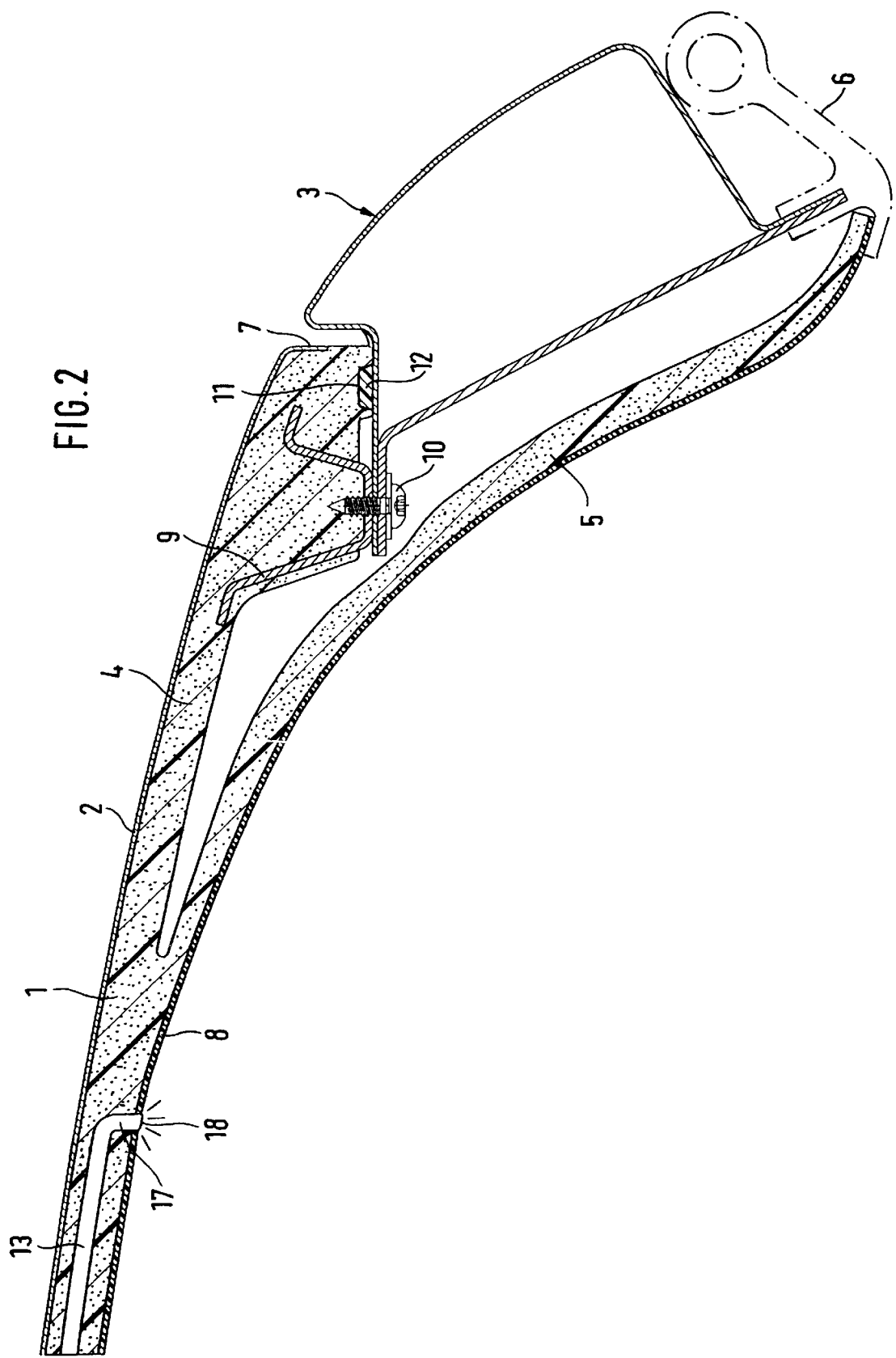

VEHICLE ROOF, IN PARTICULAR A MOTOR VEHICLE ROOF

DESCRIPTION OF THE PRIOR ART

The invention relates to a vehicle roof, in particular a motor vehicle roof.

A vehicle molded roof is known from the prior art, which is of sandwich construction and has an inner shell moulded from foamed plastic that is designed as the roof interior.

This type of modular, ready-to-install, prefabricated vehicle roof is made separately from the vehicle body and is only joined to the vehicle body at the end of the assembly line in the automotive factory. Because of the considerable shortening of the assembly time at the end of the line in particular, vehicle roof modules of this type are gaining increasing importance.

In the case of such a known vehicle roof (DE 197 09 016 A1), the inner shell is divided into two layers in the area of the outside edges provided for support on the body frame, an upper layer of which can be placed on the body frame, whereas an under-layer can be curved down and is designed to clad the body frame. In this case, the areas of the inner shell that can be curved downwards are provided at suitable points with at least one pre-assembled element of the group consisting of sun visors, handles, ventilation grilles, interior lights, shock absorbing safety elements, airbags, etc. or with application points prepared for at least one of these elements.

Normally, motor vehicles are provided with lamps in the ceiling and/or the upper body frame, the side body pillars, and occasionally at other points too, like the interior mirror bracket, for the interior lighting of the passenger compartment.

Therefore, the known interior lamps for motor vehicles are only fitted at a few specific points. In the case of vehicles with limousine bodies, often only one lamp is provided, in the centre in the vicinity of the windscreen, and another lamp placed centrally above the rear seats. In spite of fitting lenses to the few interior lights, these are not able to illuminate the vehicle interior uniformly and clearly defined light islands are formed instead.

An object of the present invention is to provide a modular, prefabricated vehicle roof of the design described above with an integrated lighting system for the vehicle interior to illuminate the latter as uniformly and/or specifically as possible.

SUMMARY OF THE INVENTION

According to the present invention, there is provided a vehicle roof that is of a sandwich construction, having an inner shell molded from foam plastic which is designed as a roof interior, the roof being made separately from the vehicle body and having outside edges which can be placed on a vehicle frame and can be permanently connected to the latter; wherein a plurality of light conducting rods, preferably made from glass, are molded into the inner shell, the rods being connected to a light source and having light emitting ends which face, in use, a vehicle interior and are disposed at a distance from each other in the visible surface of the roof interior.

The lighting system proposed with the invention provides for foam molding several light conducting rods, preferably made from glass, into the inner shell which are connected to a light source and whose light emitting ends face the vehicle interior and are disposed at a distance from each other in the visible surface of the roof. As is known, light conducting glass rods can be of any shape and of any cross-section. They allow the transport of light energy without significant losses through inner total reflection, which can also be increased by silvering the boundary surfaces. Through a suitable choice of the refraction coefficients, the light energy transport can include all the directed beams arriving at the inlet surface and allow them to exit at the outlet surfaces, even if the shape of the glass rods differs considerably from the rectilinear form. It can be seen that the invention allows an adaptation of the lighting system to all the lighting requirements that can occur for vehicle interiors, the complete system already being an unobtrusive component of the vehicle roof module. The light emitting ends or outlet surfaces of the glass rods integrated into the visible surface of the roof are unobtrusive and therefore do not disturb the appearance. It is not necessary to install additional lamps.

A common light source can be provided for all the molded-in light conducting glass rods so that the lighting system has a very simple structure.

The light source can also be molded in to the inner shell so that the lighting system as a whole is not visible, with the exception of the light outlet surfaces of the glass rods on the roof interior.

To achieve a largely uniform lighting of the compartment, the light emitting ends of the glass rods, i.e. the light outlet surfaces of the glass rods, can be disposed in a regular distribution in the visible surface of the inner shell. In a preferred embodiment (shown in FIG. 5), the light emitting ends of the glass rods can be arranged in rows.

The lighting system opens up the advantageous possibility of adapting the essential section of the length of the light conducting glass rods to the curvature of the roof and molding them in at more or less equal and constant distances in relation to the visible surface of the inner shell. In this way, the lighting system more or less forms a further layer in the sandwich-type construction of the vehicle roof.

For practical purposes, the light conducting glass rods are connected to the light source in parallel with each other and extend in the parallel position as far as the relevant point of curvature. Through these measures, the lighting system has a clear and simple construction from the production point of view.

BRIEF DESCRIPTION OF THE DRAWINGS

Further details of the invention are given below on the basis of the drawings illustrating one example embodiment, where:

FIG. 1 shows an open representation of the interior view of the vehicle roof module, and FIG. 2 the open section through the vehicle roof module corresponding to the section line II—II in FIG. 1.

DESCRIPTION OF THE PREFERRED EMBODIMENT

The drawings show an example roof module having a basic structure that is made according to the teachings of the German patent application DE 197 09 016 A1. This invention is not limited to such a roof module structure, however, as it can be used for all roof modules with a foam molded interior shell, irrespective of how the outside edge areas of the interior shell intended for support on the body frame are designed.

The inner shell 1 of the roof module is made from a foam plastic which is foamed onto a rigid roof skin 2. The rigid roof skin 2 consists of a deep drawn metal sheet, an aluminum sheet, for example, or can be made from a vacuum molded plastic foil. However, the invention can also be used for roof module embodiments where no solid roof skin is provided. In this case, the roof module basically consists of a rigid, shell-shaped and intrinsically rigidly molded foam plastic with smooth paintable or painted outside surface.

The inner shell is divided into two layers in the area of the outside edges provided for support on the body frame 3, the upper layer 4 of which is placed on the vehicle frame 3, whereas the bottom layer 5 projects over the outside edges of the vehicle roof and can be curved down, without permanent set, to pass through the body opening delimited by vehicle frame 3. The bottom layer 5 is designed to rest on the vehicle frame and for fixing to it, for example by means of function elements to be bolted to the body frame 3 (not illustrated). The connection between the bottom layer 5 and the vehicle frame 3 can use a connecting piping 6, profiled from an elastomer material and illustrated by chain dot lines in FIG. 2, which can also have a cavity section for sealing the adjacent vehicle door (not illustrated) in relation to the vehicle frame 3.

Suitable materials for the inner shell are rigid foam plastics based on PUR which can be reinforced with fibre substances, e.g. glass fibre sections, incorporated in the plastic before it is foamed on. However, fabrics, woven and non-woven fabrics, etc. placed in the foaming mold are also suitable as reinforcement. By foaming on to the reinforced inner shell 1, whose upper layer 4 extends as far as an edge 7 of the roof skin 2, a sandwich-type roof module is created with a high dimensional stability and strength. All the inner contours of the inner shell 1, including the bottom layer 5, are formed by suitable shaping of the foam mold (not illustrated).

The inside surface of the inner shell 1 can be covered to form a roof interior surface with a textile or foil type covering material 8. A reinforcement part 9, in the form of a continuous profile, can be embedded in the upper foam layer 4. This reinforcement part 9 is used to secure the roof module to the body frame 3 using bolts 10. Otherwise, the upper layer 4, which is thicker in the area of the support on the body frame 3, is provided with a molded-in groove 11 all round which accommodates an adhesive bead 12 which seals the roof module in relation to the body frame 3 and also secures it to it.

The embodiment example according to FIG. 1 shows fifteen light conducting glass rods or wires 13, all of which originate from a common light source 14, initially in a parallel position to each other. Five glass rods 13 are curved outwards at curvature points 15 at regular intervals on each side. The remaining five inner glass rods 13 between the two outer groups of five glass rods 13 each are also curved to one side at curvature points 16 in transverse alignment with the curvature points 15, however the shortest of these glass rods not being curved to the side, but with its light emitting ends 17 directed directly to the vehicle interior. The fifteen glass rods 13 are of different lengths and remain in parallel with the other glass rods 13 as far as the corresponding curvature points 15 and 16.

As FIG. 1 also illustrates, the lengths of the individual glass rods are dimensioned so that the light emitting ends 17 of all the glass rods form three parallel rows of five light emitting ends 17 in the longitudinal direction of the roof. In addition, three of the light emitting ends 17 are disposed in five parallel rows in the transverse direction of the roof. In this way, a regular distribution of the light emitting ends 17 of the glass rods 13 is achieved in the surface of the inner shell 1 formed by the covering material 8. Naturally, the scope of the invention also includes a bigger or smaller number of light rods and other distribution patterns of their light emitting ends.

FIG. 2 shows an individual glass rod 13 with a part area of its length between a curvature point 15 and its light emitting end 17. It can also be seen that the light outlet surface 18 of the light emitting end 17 more or less lies in the plane of the visible surface of the covering material 8 of the inner shell 1. Finally, it can be seen from FIG. 2 for the area of the glass rod 13 illustrated that the glass rod 13 is adapted to the roof curvature in the transverse direction. A corresponding adaptation to the curvature, both to the transverse curvature and the longitudinal curvature of the vehicle roof, is done for all the glass rods 13 present. The glass rods 13 are inserted into the foaming mold for molding in so that in the finished roof module, they have more or less the same and constant distances over their length both in relation to the roof skin 2 and to the covering material 8.

When the vehicle module is installed, the light source 14 is connected in a suitable manner (not illustrated) to the on-board power supply of the vehicle with the connection of an on/off switch and, if required, a dimmer. Naturally, the electric cable to the light source 14 can also be molded into the inner shell 1 so that it is not visible.

A vehicle module with integrated lighting system for the interior lighting is proposed. The lighting system, consisting of several light conducting rods, preferably made from glass, and a light source, is molded into the inner shell of the roof module forming the roof interior molded from foam plastic so that only the light outlet surfaces of the light emitting ends of the light conducting rods are disposed in the visible surface of the roof interior. Through a suitable selection of the number of light conducting rods and the distribution pattern of the corresponding light outlet surfaces, both a uniform interior lighting and special lighting effects can be achieved.

The preceding description is exemplary rather than limiting in nature. Variations and modifications to the disclosed example may become apparent to those skilled in the art that do not necessarily depart from the essence of this invention. The scope of legal protection given to this invention can only be determined by studying the following claims.

I claim:

1. A vehicle roof that is made separately from the vehicle body and has outside edges that can be placed on the vehicle frame and can be permanently connected to the vehicle frame, comprising:

a foam plastic inner shell designed as a roof interior;

a plurality of light conducting rods molded into the inner shell, having light emitting ends on one side of the shell facing in a direction of a vehicle interior when the roof module is placed on the vehicle frame, the light emitting ends being disposed at a distance from each other in the visible surface of the roof interior; and at least one light source coupled with the light conducting rods.

2. The vehicle roof of claim 1 wherein the light conducting rods comprise glass.

3. The vehicle roof of claim 1 wherein the light source is a single light source coupled with all the light conducting rods.

4. The vehicle roof of claim 1, wherein the light source is a single light source coupled with all the light conducting rods and wherein the light source is molded into the inner shell.

5. The vehicle roof of claim 1, wherein the light emitting ends of the rods are disposed in a regular distribution in the visible surface of the inner shell.

6. The vehicle roof of claim 1, wherein the light emitting ends of the rods are arranged in rows.

7. The vehicle roof of claim 1, wherein a substantial portion of the length of each light conducting rod has a curvature that corresponds to a curvature of the roof such that each light conducting rod is at approximately the same distance from the visible surface of the inner shell along the length of each rod.

8. The vehicle roof of claim 1, wherein the light conducting rods each have a portion extending parallel to a portion of the other rods and wherein the parallel portions begin at the ends of the rods that are connected with the light source.

9. The vehicle roof of claim 1, including a roof exterior surface secured to an exterior facing side of the foam plastic inner shell.

* * * * *